US005418042A

United States Patent [19]

Thirtle et al.

[11] Patent Number: 5,418,042

[45] Date of Patent: May 23, 1995

[54] ELECTROSTATIC PRINTING ELEMENT

[75] Inventors: James H. Thirtle, Rochester; Steven J. Morganti, Brockport, both of N.Y.; John H. Bayless, Jr., Hendersonville, N.C.

[73] Assignee: E. I. Du Pont de Nemours and Company, Wilmington, Del.

[21] Appl. No.: 177,804

[22] Filed: Jan. 6, 1994

Related U.S. Application Data

[63] Continuation of Ser. No. 918,773, Jul. 22, 1992, abandoned.

[51] Int. Cl.[6] ........ B32B 9/00

[52] U.S. Cl. ........ 428/195; 428/485; 428/486; 428/482

[58] Field of Search ........ 428/195, 206, 327, 341, 428/342, 478, 913, 914, 480, 68, 485, 486, 482, 483; 252/500; 106/125

[56] References Cited

U.S. PATENT DOCUMENTS

| | | | |
|---|---|---|---|
| 3,847,661 | 11/1974 | Hill et al. | 117/218 |
| 4,111,926 | 9/1978 | Serg | 106/125 |
| 4,557,856 | 12/1985 | Miyakawa | 252/500 |
| 4,588,649 | 5/1986 | Kriz et al. | 428/511 |
| 4,783,376 | 11/1988 | Sakaki | 428/68 |
| 4,908,277 | 3/1990 | Tsunashima | 428/480 |
| 5,023,129 | 6/1991 | Morganti et al. | 428/195 |
| 5,073,533 | 12/1991 | Aono | 428/421 |
| 5,098,883 | 3/1992 | Aono | 428/195 |

OTHER PUBLICATIONS

Bruno, Michael H., *Principles of Color Proofing,* GAMA Communications, Salem, N.H. (1986), pp. 319–320.

*Grant and Hach Chemical Dictionary,* 5th edition, McGraw–Hill Book Company, 1987.

*Primary Examiner*—Patrick J. Ryan
*Assistant Examiner*—Patrick R. Jewik

[57] ABSTRACT

Improved image receiving elements for nonimpact printing comprising a support and an image receiving layer, said image receiving layer comprising a whitening agent and a binder, said binder consisting essentially of 10–25% gelatin and 75–90% water soluble, film forming acrylic polymer are disclosed.

11 Claims, No Drawings

ELECTROSTATIC PRINTING ELEMENT

This is a continuation of application Ser. No. 07/918,773, filed Jul. 22, 1992, now abandoned.

FIELD OF THE INVENTION

This invention relates to an improved image receiving element for nonimpact printing. Specifically, this invention relates to an element comprising a support and an image receiving layer, said image receiving layer comprising a whitening agent and a binder, said binder consisting essentially of gelatin and a water soluble, film forming acrylic polymer.

BACKGROUND OF THE INVENTION

Nonimpact printing includes such well-known techniques as electrostatic printing, ink jet printing, pen plotter printing, and the like. Unlike conventional printing processes, nonimpact printing concerns the transfer of an image to an image receiving element without exerting a tremendous amount of force.

In electrostatic recording, an image is formed from a pattern of charge produced on a drum. A toner, which is normally in the form of a dry powder or a non-aqueous dispersion, is applied to the drum to produce a toned image corresponding to the pattern of charge. The toned image is then transferred to an image receiving element. A permanent image is produced by fixing the toned image by for example, heating or by removal of the solvent.

Nonimpact printing processes are particularly useful for recording high-speed computer output because they (i) can be carried out under extremely high recording speeds, (ii) require low energy levels, and (iii) do not require chemical processing. In these applications, it is important to have image receiving elements pass quickly through the imaging device without sticking or adhering to one another.

Generally, image receiving elements comprise a support and an image receiving layer provided thereon. The support is typically paper, however, paper does not wear well and tends to stick to the other papers when multiple sheets of paper are fed into these high speed imaging devices. Thus, polymer films have often been used as the support. A problem with using polymer films is that they often accumulate static charges that also prevent the element from passing quickly through the imaging device.

In many image receiving elements for nonimpact printing, the image receiving layer is coated from an organic solvent. The use of organic solvents for coating is frequently undesirable because of flammability, toxicity, and waste disposal considerations. Residual solvent also may remain in the coating and produce odor problems during use of the element.

Morganti, U.S. Pat. No. 5,023,129, discloses an image receiving element comprising a transparent support with an antistatic layer on one surface and an imaging receiving layer on the other. Although the image receiving layer may be coated from water and the element does not adhere to other elements in the recording device due to the accumulation of static charge, the image is not water resistant.

Accordingly, a need exists for a receiving element for nonimpact printing that (i) provides good image permanence, (ii) passes readily through the recording device, and (iii) produces a water resistant image.

SUMMARY OF THE INVENTION

In one embodiment this invention is an image receiving element suitable for electrostatic printing comprising:

(A) a dimensionally stable support having a first side and a second side; and (B) an image receiving layer on at least the first side of said support, said image receiving layer comprising:

(1) a binder consisting essentially of, wherein the percentages are percentages by weight of the total binder present:

(a) 10–25% of gelatin, and (b) 75–90% of a water soluble, film forming acrylic polymer, wherein said polymer forms a film below 60° C. without the aid of an organic coalescing solvent, and wherein the polymer softens between about 70° C. and about 120° C.; and (2) a whitening agent present in sufficient amount to produce an element having an optical density of about 0.2 or greater;

wherein said element has a surface resistivity of about $10^{10}$–$10^{13}$ ohms.

In a preferred embodiment, the image receiving layer additionally comprises an antistat agent and a crosslinking agent.

DETAILED DESCRIPTION OF THE INVENTION

The improved image receiving element of the invention is suitable for nonimpact printing and comprises an image receiving layer and a support.

Surprisingly and unexpectedly, it was found that an image receiving element having an image receiving layer comprising (i) a binder consisting essentially of 10–25% gelatin and 75–90% of a water soluble film forming acrylic polymer and (ii) a whitening agent wherein said element has a surface resistivity of about $10^{10}$–$10^{13}$ ohms, produced images that were permanent and water resistant.

IMAGE RECEIVING LAYER

The image receiving layer comprises a binder and a whitening agent. Other ingredients, such as crosslinking agents, antistat agents, matte agents, and surfactants also may be present in the image receiving layer to achieve the desired balance of functional and aesthetic properties. These ingredients must be compatible with the other ingredients of the image receiving layer and must not adversely affect the properties of the image receiving layer, the image receiving element, or the image formed on the element.

BINDER

The binder consists essentially of gelatin and a water soluble, film forming acrylic polymer. Any photographic gelatin may be used in practicing the invention.

The binder also contains a water soluble or water dispersible film forming acrylic polymer. Water soluble or water dispersible polymers such as carboxylated acrylics, carboxylated poly(vinyl acetate), and poly(vinyl butyral) can be used to prepare coating solutions that can be coated from aqueous formulations, thus avoiding the problems associated with coating from organic solvents.

Carboxylated acrylic polymers are preferred. Carboxylated acrylic polymers are polymers that comprise acrylic acid and/or methacrylic acid copolymerized with other monomers, such as, for example, methyl acrylate, methyl methacrylate, ethyl acrylate, styrene, and alpha-methyl styrene. The copolymer must comprise a sufficient level of polymerized acrylic acid and/or methacrylic acid to make it water soluble or water dispersible. Acrylic/styrene copolymers, such as Rhoplex ® AC-1822, are preferred.

It is important that the polymer form a film below 60° C., preferably at or below 21° C., without the aid of an organic coalescing solvent. If an organic coalescing solvent is required, it is not possible to coat the image receiving layer from water. The molecular weight of the polymer is not critical, provided the polymer is of sufficient molecular weight to form a film, but not of such high molecular weight that it cannot be coated. For applications in which the image receiving layer must accept toner, as for example in electrostatic printing, the polymer should soften between about 70° C. and about 120° C., preferably at or near 70° C.

The binder consists essentially of 10–25% by weight gelatin and 75–90% by weight of the film forming acrylic polymer. If the binder contains more than about 25% gelatin, image permanence is adversely affected. If the binder contains less than about 10% gelatin, the layer has decreased resistance to organic solvents. Binders containing 13–17% by weight gelatin and 83–87% by weight acrylic polymer are preferred. The most preferred binders contain about 15% gelatin and about 85% acrylic binder.

WHITENING AGENT

A whitening agent is added to the image receiving layer to produce a white, translucent to opaque, element. Numerous whitening agents are well known to those skilled in the art and may be used in the image receiving layer. These include, for example, titanium dioxide, zinc oxide, barium sulfate, calcium carbonate, etc. Titanium dioxide is preferred. Hollow polystyrene spheres are susceptible to attack by organic solvents and should not be used for applications in which the element must resist attack by organic solvents.

For nonimpact printing applications, image receiving elements must have a transmission optical density of at least 0.2 (27% of the incident light absorbed), preferably 0.3–0.4 (50%–60% of the incident light absorbed). For certain applications, such as those in which it is desired to place an image on each side of the element, an optical density of 0.9 (87% of the incident light absorbed) is required. The transmission optical density of the element can readily be determined by methods well-known to those skilled in the art, such as for example, absorption spectroscopy.

The amount of whitening agent required will depend on (i) the desired optical density, (ii) the density of the whitening agent, (iii) its particle size, and (iv) its covering power. However, when a single image receiving layer is present, the coating weight of the whitening agent will typically be about 0.2 to 2.0 g/m$^2$, more typically about 0.3 to 0.8 g/m$^2$. When two image receiving layers are present, the coating weight of the whitening agent will typically be about 0.1 to 1.0 g/m$^2$, more typically about 0.15 to 0.4 g/m$^2$.

ANTISTAT AGENTS

The element should have a surface resistivity of about $10^{10}$ to about $10^{13}$ ohms in order to obtain optimum image quality, which is required in electrostatic imaging, and reliable transport through the recording device. If the binder does not provide sufficient conductivity, the conductivity of the element may be enhanced by the addition of an antistat agent to the image receiving layer.

The antistat agent must be compatible with the other ingredients of the image receiving layer and must not adversely affect the properties of the image receiving layer, the image receiving element, or the image formed on the element. Typical antistat agents are electroconductive polymers, such as for example, sulfonated styrene-maleic anhydride copolymers and the polymeric amine salts described in Sinkovitz, U.S. Pat. No. 4,148,639. Sulfonated styrene-maleic anhydride copolymers, such as Versa ® TL 4, are preferred.

Sufficient antistat agent should be added to produce an element having a surface resistivity of about $10^{10}$ to about $10^{13}$ ohms. If the resistivity is greater than about $10^{13}$ ohms, the element may not pass through the recording device and thus, the quality of electrostatic images will be compromised. If the resistivity is less than about $10^{10}$ ohms, the quality of electrostatic images will be adversely affected or no image will be transferred to the image receiving layer.

OTHER INGREDIENTS

The image receiving properties of the image receiving layer are generally improved if both the acrylic polymer and the gelatin are crosslinked. If the acrylic polymer is not self-crosslinking the polymer may be crosslinked with about 5–10%, based on the dry weight of the polymer, of a crosslinking agent. Suitable crosslinking agents are polyfunctional aziridines, such as, for example, PFAZ ® 322 or XAMA-7. Gelatin can be crosslinked by using any of the well known hardening agents. Aldehydes, such as, for example, formaldehyde, glyoxyl, or glutaraldehyde, are preferred. Formaldehyde is more preferred. The aldehyde must be added in sufficient quantity to crosslink the gelatin, typically 3–20 mg of aldehyde/g of gelatin present.

Matte agents may be added to the image receiving layer to improve both image quality and the transport properties of the element in the image receiving device. Conventional matte agents such as, for example, silica matte or rice starch, may be used to roughen the surface of the element. Polymethyl methacrylate beads also may be used, but are not preferred for applications in which the layer must resist attack by organic solvents, i.e., acetone erasable elements. Polymethyl methacrylate beads are susceptible to attack by acetone and other organic solvents, and therefore, the layer may be less resistant to organic solvents if these beads are present.

Matte agents having an average particle size about 2–12 microns are preferred. Coating weights for matte agents are typically about 0.4 to 12 g/m$^2$, preferably about 0.6 to 1.0 g/m$^2$.

Preferably at least one dispersing agent is added to the coating solution for the image receiving layer. Mixtures of dispersing agents may be used. Typical dispersing agents are, for example, polyoxyethylene ethers, or anionic surfactants, such as, for example, sodium lauryl ether sulfate, fluoroalkyl carboxylates, and cocoalkyldimethyl betaine. A sufficient amount of dispersing agent should be added so that a smooth, continuous, extremely uniform, flaw free coating is obtained.

If the gelatin level is low, the coating may be runny and prone to mottle during drying. A viscosity enhancing agent, such as Xanthan gum, may be added to the coating solution in an amount sufficient to prevent mottle during drying.

SUPPORT

Polymer films that are transparent and dimensionally stable are used to prepare the electrographic recording films of the invention. Suitable polymer films include polyethylene terephthalate, polyethylene, and the like. While the thickness of the polymer film is not critical, films of 75–200 microns may be used. As is well-known to those skilled in the art, conventional resin subcoats, such as, for example, the vinylidene-itaconic acid subbing described in Rawlins, U.S. Pat. No. 3,567,452, may be coated onto the support to provide anchorage for the image receiving layer or layers. The film also may contain additional conventional coatings, such as a gelatin sub-coat, provided the properties of the element are not adversely affected.

MANUFACTURE

The image receiving layer is coated from an aqueous solvent. The use of an aqueous solvent avoids the problems associated with the use of organic solvents, such as for example flammability, toxicity and waste disposal. The problems caused by residual solvent remaining in the image receiving layer are also avoided when an aqueous solvent is used. Aqueous solvent means a solvent consisting essentially of water. As is well known to those skilled in the art, coating solution refers to the mixture of coating solvent and additives that is coated onto the support, although some of the additives may be suspended solids rather than in solution.

The image receiving layer is normally applied to the support while it is in web form using conventional web-coating methods, such as bar coating, blade coating, reverse roll coating, Meyer rod coating, and offset gravure coating. It is especially important that the image receiving layer is a smooth, continuous, extremely uniform, flaw free coating. Thin spots, pinholes, or coating skips in the image receiving layer can adversely affect the quality of the final image.

The coating solution is formed by adding the ingredients of the image receiving layer to water and mixing said ingredients until they are dissolved or suspended. The time of addition of the crosslinking agents to the coating solution is not critical, provided the coating solution is not heated or stored for such a long period of time after addition and prior to coating that crosslinking occurs before the image receiving layer is coated onto the support. The crosslinking agents may be conveniently added immediately before coating, or added by on-line injection to the coating solution during coating.

The coating solution is 5–12%, preferably 7–10% binder solids. Total solids in the coating solution are 7–14%, preferably 9–12%. Dry coating weight for the image receiving layer is about 2.5 to about 5.0 g/m$^2$, preferably about 3.5 to about 5.0 g/m$^2$.

Nonimpact printing processes are capable of extremely high recording speeds, require low energy levels, and do not require chemical processing. These processes are particularly useful for recording high-speed computer output in such applications as geophysical mapping, weather map printing, and the preparation of architectural and engineering drawings.

The advantageous properties of this invention can be observed by reference to the following examples that illustrate, but do not limit, the invention.

EXAMPLES

GLOSSARY

| | |
|---|---|
| Amphosol ® DM | Cocoalkyldimethyl betaine (30% in water); CAS 68424-94-2; Stepan Europe, Voreppe, France |
| Davidson 308 | Silica matte, 5–6 micron (17% in water with 6.8% gelatin); Davidson Chemical, Cincinnati, OH |
| FC 127 | Fluorad ® FC 127 fluorosurfactant (5% in water); Potassium fluoroalkyl carboxylate; 3M, St. Paul, MN |
| Polystep ® B27 | Sodium lauryl ether sulfonate (15% in water); Stepan Chemical, Northfield, IL |
| PFAZ ® 322 | 1,1,1-Trimethylolpropane tris(2-methyl-1-aziridine propionate); CAS 64265-57-2; Sybron Chemical, Birmingham, NJ |
| Rhoplex ® AC-1822 | Acrylic/styrene copolymer (45–48% by weight) in water with a maximum of 2% of 2-dimethylaminoethanol; CAS 84931-97-5; Rohm and Haas, Philadelphia, PA |
| Syloid ® 72 | Synthetic silica (17% in water); Davidson Chemical, Cincinnati, OH |
| Versa ® TL 4 | Sulfonated styrene-maleic anhydride copolymer (25% in water); CAS 90093-47-3; National Starch, Bridgewater, NJ |

General Procedures

In the Examples that follow, as will be obvious to those skilled in the art, "coating solution" refers to the mixture of coating solvent and additives that is coated on the support, although some of the additives may be in suspended solids rather than in solution. "Total solids" refers to the total amount of nonvolatile material in the coating solution although some of the additives may be nonvolatile liquids at ambient temperature rather than solids.

Evaluation Procedures

After coating and drying, the elements were evaluated by imaging in a Canon NP4540, a Xerox 2510, and/or a Xerox 5080 electrostatic copier. Image quality was determined by visual examination at 1× and 10× magnification. Images with fuzzy edges, fringing, and stray toner at the edges of the image were considered to be poorer quality. Image permanence was determined by an adhesive tape test. Water resistance was determined by placing a drop of water on the image and rubbing with tissue placed over a Q-Tip. Acetone resistance was determined by placing a drop of acetone on the image and rubbing with a tissue placed over a Q-Tip. Surface resistivity was determined with a Keithley Model 610C solid state electrometer (Keithley Instruments, Cleveland, Ohio).

EXAMPLE 1

A coating solution was prepared according to the following procedure: 186 kg of deionized water; 13.3 kg of a slurry of 30% rice starch and 9% Superfine silica matte in water; 44.4 kg of Rhoplex ® AC-1822 (added very slowly); 1.92 kg of gelatin (Kind and Knox Type 2964, Sioux City, Iowa); and 0.32 kg of Xanthan gum (Kelco K5C151, San Diego, Calif.) were placed in a container and stirred at room temperature for 0.5 hr. to form a mixture. The mixture was heated to about 57° C. and stirred for an additional 0.5 hr. The mixture was then cooled to about 41° C. After cooling, the following ingredients were added: 10.0 kg of Versa® TL 4; 8.40 kg of anatase titanium dioxide (13% by weight in water with 6.4% gelatin); 0.94 kg of Amphosol® DM; and 10.50 kg of Davidson 308 silica matte (17% in water with 6.8% gelatin). The silica matte was melted in hot water before addition. Less than 0.5 hr before coating, 4.10 kg of PFAZ®, diluted with 8.20 kg of water, was added to the solution.

Using conventional coating techniques, the coating solution was coated onto both sides of an about 100 micron thick clear, photographic grade, polyethylene terephthalate support subbed with a conventional subbing layer. The coating solution was held at 41° C. during coating. During coating, 10.0 kg of formaldehyde solution (4% in water) was added to the coating solution by on-line injection. The coating weight was about 5 g total solids/$m^2$ on each side of the support. The element was air dried at about 54° C. for about 20 min. The element was evaluated as described above.

A white translucent element that had excellent toner acceptance was produced. Image quality was excellent. Image permanence was excellent. The coating and the image had excellent resistance to both water and acetone. Surface resistivity was $10^{12}$ ohms. Transport through the copier was excellent.

EXAMPLES 2-6

Following the general procedure of Example 1, the coating solutions described in Table 1 were prepared and coated onto both sides of an about 100 micron thick clear, photographic grade, polyethylene terephthalate support subbed with a conventional subbing layer. In all examples, the crosslinking agents (PFAZ® and formaldehyde) were added immediately prior to coating.

TABLE 1[a]

| | Ex. 2 | Ex. 3 | Ex. 4 | Ex. 5 | Ex. 6 |
|---|---|---|---|---|---|
| Water | 616 | 685 | 662 | 687 | 663 |
| Gelatin | 21 | 9 | 9 | 9 | 7 |
| Rhoplex® AC-1822 | 132 | 147 | 142 | 147 | 142 |
| Syloid® 72 | 101 | 0 | 0 | 0 | 0 |
| Rice Starch | 0 | 44 | 42 | 43 | 42 |
| Polystep® B27 | 35 | 38 | 37 | 0 | 0 |
| $TiO_2$ | 90 | 56 | 54 | 56 | 54 |
| Formaldehyde[b] | 5 | 5 | 5 | 5 | 5 |
| Xanthan gum | 0 | 1 | 1 | 1 | 1 |
| PFAZ® | 0 | 15 | 15 | 15 | 15 |
| Versa® TL-4 | 0 | 0 | 33 | 34 | 33 |
| Amphosol® DM | 0 | 0 | 0 | 3 | 0 |
| Davidson 308 | 0 | 0 | 0 | 0 | 35 |
| FC 127 | 0 | 0 | 0 | 0 | 3 |

[a]all amounts expressed in g/kg of coating solution.
[b]4% in water.

Example 2 was carried out on a laboratory scale (about 0.5 kg). Examples 3-6 were carried out on a semiworks scale (3-4 kg) or production scale (300-700 kg). The elements were air dried and evaluated as described above.

In Examples 2-5, a white semi-opaque image receiving element with excellent toner acceptance was produced.

In Example 2, image quality was good and image permanence was very good. The coating and the image had excellent resistance to both water and to acetone. Surface resistivity was greater than $10^{13}$ ohms. Transport through the copier was good.

The image quality in Example 3 was good and image permanence was excellent. The coating and the image had excellent resistance to both water and to acetone. Surface resistivity was greater than $10^{13}$ ohms. Transport through the copier was good.

The image quality in Examples 4, 5, and 6 was excellent and image permanence was excellent. The coating and the image had excellent resistance to both water and acetone. Surface resistivity was $10^{12}$ ohms. Transport through the copier was excellent.

Having described the invention, we now claim the following and their equivalents.

What is claimed is:

1. An image receiving element suitable for electrostatic printing comprising:
 (A) a dimensionally stable support having a first side and a second side; and
 (B) an image receiving layer on at least the first side of said support, said image receiving layer comprising:
  (1) a binder consisting-essentially of, wherein the percentages are percentages by weight of the total binder present:
   (a) 10-25% of gelatin, and
   (b) 75-90% of a water soluble, film forming acrylic polymer, wherein said polymer forms a film below 60° C. without the aid of an organic coalescing solvent, and wherein the polymer softens between about 70° C. and about 120° C.;
  (2) a whitening agent present in sufficient amount to produce an element having an optical density of 0.2 or greater; and
  (3) an antistat agent present in sufficient amount to produce a surface resistivity of about $10^{10}$-$10^{13}$ ohms.

2. The element of claim 1 wherein said image receiving layer additionally comprises a crosslinking agent, wherein said crosslinking agent is present in sufficient amount to crosslink said acrylic polymer or said gelatin.

3. The element of claim 2 wherein said image receiving layer is present on both the first surface and the second surface of said support.

4. The element of claim 1 wherein said support is polyethylene terephthalate.

5. The element of claim 2 wherein said crosslinking agent is an aldehyde.

6. The element of claim 2 wherein said crosslinking agent is a polyfunctional aziridine.

7. The element of claim 2 wherein said acrylic binder is an acrylic/styrene copolymer.

8. The element of claim 2 wherein said binder consists essentially of 13-17% of said gelatin and 83-87% of said acrylic polymer.

9. The element of claim 2 wherein said element has an optical density of at least 0.9.

10. The element of claim 9 wherein said acrylic binder is an acrylic/styrene copolymer.

11. The element of claim 10 wherein said support is polyethylene terephthalate and both an aldehyde crosslinking agent and a polyfunctional aziridine crosslinking agent are present.

* * * * *